(12) United States Patent
Miwa

(10) Patent No.: US 10,841,440 B2
(45) Date of Patent: Nov. 17, 2020

(54) IMAGE READING APPARATUS

(71) Applicant: Brother Kogyo Kabushiki Kaisha, Nagoya (JP)

(72) Inventor: Atsushi Miwa, Anjo (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/261,840

(22) Filed: Jan. 30, 2019

(65) Prior Publication Data

US 2019/0238697 A1 Aug. 1, 2019

(30) Foreign Application Priority Data

Jan. 31, 2018 (JP) .................................. 2018-014379

(51) Int. Cl.
| | |
|---|---|
| *H04N 1/00* | (2006.01) |
| *B65H 1/06* | (2006.01) |
| *B65H 1/08* | (2006.01) |
| *B65H 29/50* | (2006.01) |
| *B65H 31/02* | (2006.01) |
| *B65H 31/10* | (2006.01) |

(52) U.S. Cl.
CPC .......... *H04N 1/00525* (2013.01); *B65H 1/06* (2013.01); *B65H 1/08* (2013.01); *B65H 29/50* (2013.01); *B65H 31/02* (2013.01); *B65H 31/10* (2013.01); *H04N 1/00615* (2013.01); *H04N 1/00649* (2013.01); *B65H 2301/4212* (2013.01); *B65H 2403/724* (2013.01); *B65H 2405/11151* (2013.01); *B65H 2405/3321* (2013.01); *B65H 2801/39* (2013.01)

(58) Field of Classification Search
None
See application file for complete search history.

(56) References Cited

U.S. PATENT DOCUMENTS

| | | | | |
|---|---|---|---|---|
| 5,785,440 | A | * 7/1998 | Nishikawa | ............... B41J 15/16 399/328 |
| 8,023,880 | B2 | * 9/2011 | Terao | ................. G03G 15/6552 399/397 |

(Continued)

FOREIGN PATENT DOCUMENTS

| | | |
|---|---|---|
| JP | H10-167545 A | 6/1998 |
| JP | 2005-008283 A | 1/2005 |

(Continued)

*Primary Examiner* — Beniyam Menberu
(74) *Attorney, Agent, or Firm* — Banner & Witcoff, Ltd.

(57) ABSTRACT

An image reading apparatus includes a supply tray which support sheets and includes a movable plate configured to move in correspondence to reduction in a number of the sheets supported on the supply tray, a discharge tray which is located below the supply tray and supports discharged sheets, a conveyance guide which guides a sheet conveyed from the supply tray toward the discharge tray, a reading sensor which reads an image on the sheet conveyed along the conveyance guide, and a discharge unit having a discharge opening for discharging the sheet to the discharge tray and moves from a third position to a fourth position in correspondence to reduction in the number of the sheets supported on the supply tray. A first timing for which the movable plate is to move and a second timing for which the discharge unit is to move are different.

9 Claims, 9 Drawing Sheets

(56) References Cited

U.S. PATENT DOCUMENTS

| | | | | |
|---|---|---|---|---|
| 2005/0195450 A1* | 9/2005 | Shoji | .................. | H04N 1/00631 |
| | | | | 358/497 |
| 2005/0238397 A1* | 10/2005 | Kitaoka | ............... | G03G 15/605 |
| | | | | 399/367 |
| 2006/0023269 A1* | 2/2006 | Tsuchiya | .............. | H04N 1/0057 |
| | | | | 358/498 |
| 2015/0344246 A1* | 12/2015 | Zensai | ................. | B65H 3/0669 |
| | | | | 271/10.13 |
| 2015/0344258 A1* | 12/2015 | Tsumura | ................ | B65H 31/02 |
| | | | | 271/176 |
| 2016/0257517 A1* | 9/2016 | Watanabe | ............... | B65H 5/062 |
| 2016/0282778 A1* | 9/2016 | Suzuki | ............... | G03G 15/2039 |
| 2019/0233239 A1* | 8/2019 | Shigeno | ................. | B65H 31/02 |
| 2019/0238700 A1* | 8/2019 | Ito | .......................... | H04N 1/123 |

FOREIGN PATENT DOCUMENTS

| | | | | |
|---|---|---|---|---|
| JP | 2005008283 | * | 1/2005 | ............. B65H 83/00 |
| JP | 2009044449 | * | 2/2009 | ............... H04N 1/00 |

* cited by examiner

IMAGE READING APPARATUS

CROSS-REFERENCE TO RELATED APPLICATION

This application claims priority from Japanese Patent Application No. 2018-014379, filed on Jan. 31, 2018, the entire subject matter of which is incorporated herein by reference.

TECHNICAL FIELD

Aspects of the present invention relate to an image reading apparatus.

BACKGROUND

JP-A-2005-8283 discloses a sheet feeding apparatus, which is an example of a related-art image reading apparatus. The sheet feeding apparatus includes a feeder tray, a sheet discharge tray and a conveyance guide. The feeder tray is configured to support a sheet to be fed. The sheet discharge tray is located below the feeder tray and is configured to support the discharged sheet. The conveyance guide is configured to convey the sheet from the feeder tray toward the sheet discharge tray. An image reading position for reading an image on the sheet to be conveyed on the conveyance guide is set in the middle of the conveyance guide.

The feeder tray moves upward to come close to a sheet pickup unit in correspondence to reduction in the number of sheets supported on the feeder tray. The sheet feeding apparatus further includes a swinging conveyance unit. The swinging conveyance unit has a discharge opening for discharging the sheet conveyed by the conveyance guide to the sheet discharge tray. The swinging conveyance unit moves upward to space the discharge opening from the sheet discharge tray in correspondence to reduction in the number of the sheets supported on the feeder tray. A link member is provided between the feeder tray and the swinging conveyance unit, so that the discharge opening of the swinging conveyance unit moves upward and downward at the same timing as the feeder tray in correspondence to upward and downward movement of the feeder tray. Accordingly, the sheet feeding apparatus can be size-reduced in an upper and lower direction.

An image reading apparatus having a configuration similar to the above-described sheet feeding apparatus is assumed. The image reading apparatus includes a supply tray having a movable plate, and a discharge unit. The discharge unit has a discharge opening for discharging a sheet to a discharge tray. A link member is provided between the movable plate of the supply tray and the discharge unit. The discharge opening of the discharge unit moves upward and downward at the same timing as the movable plate of the supply tray in correspondence to upward and downward movement of the movable plate of the supply tray.

However, in this image reading apparatus, since the movable plate and the discharge unit are moved at the same timing, load of a transmission mechanism configured to transmit a drive force to the movable plate and the discharge unit tends to increase, and it is difficult to reduce power necessary for a drive source to generate the drive force. As a result, it is necessary to increase strengths and sizes of components such as gears configuring the transmission mechanism such that the transmission mechanism can bear the high load. Also, the drive source and an internal power supply configured to supply power to the drive source are required to be larger. As a result, it is difficult to reduce the manufacturing cost.

SUMMARY

Aspects of the present invention provide an image reading apparatus capable of reducing the manufacturing cost.

According to an illustrate embodiment of the present invention, there is provided an image reading apparatus including a supply tray, a discharge tray, a conveyance guide, a reading sensor, and a discharge unit. The supply tray is configured to support sheets to be fed and includes a movable plate configured to move from a first position to a second position in correspondence to reduction in a number of the sheets supported on the supply tray. The second position is higher than the first position. The discharge tray is located below the supply tray and configured to support discharged sheets. The conveyance guide is configured to guide a sheet conveyed from the supply tray toward the discharge tray. The reading sensor is configured to read an image on the sheet conveyed along the conveyance guide. The discharge unit has a discharge opening for discharging the sheet conveyed along the conveyance guide to the discharge tray and is configured to move from a third position to a fourth position in correspondence to reduction in the number of the sheets supported on the supply tray. The fourth position is higher than the third position. A first timing for which the movable plate is to move and a second timing for which the discharge unit is to move are different.

According to the above-described image reading apparatus, the first timing and the second timing are set different, so that it is possible to reduce load of a transmission mechanism configured to transmit a drive force to the movable plate and the discharge unit, and to reduce power necessary for a drive source to generate the drive force. Accordingly, it is possible to suppress the high-strengthening and enlargement of components such as gears configuring the transmission mechanism. Also, it is possible to suppress the enlargement of the drive source and an internal power supply configured to supply power to the drive source.

Therefore, the above-described image reading apparatus can reduce the manufacturing cost.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, first and second illustrative embodiments of the present invention will be described with reference to the drawings.

First Illustrative Embodiment

Figure 1:
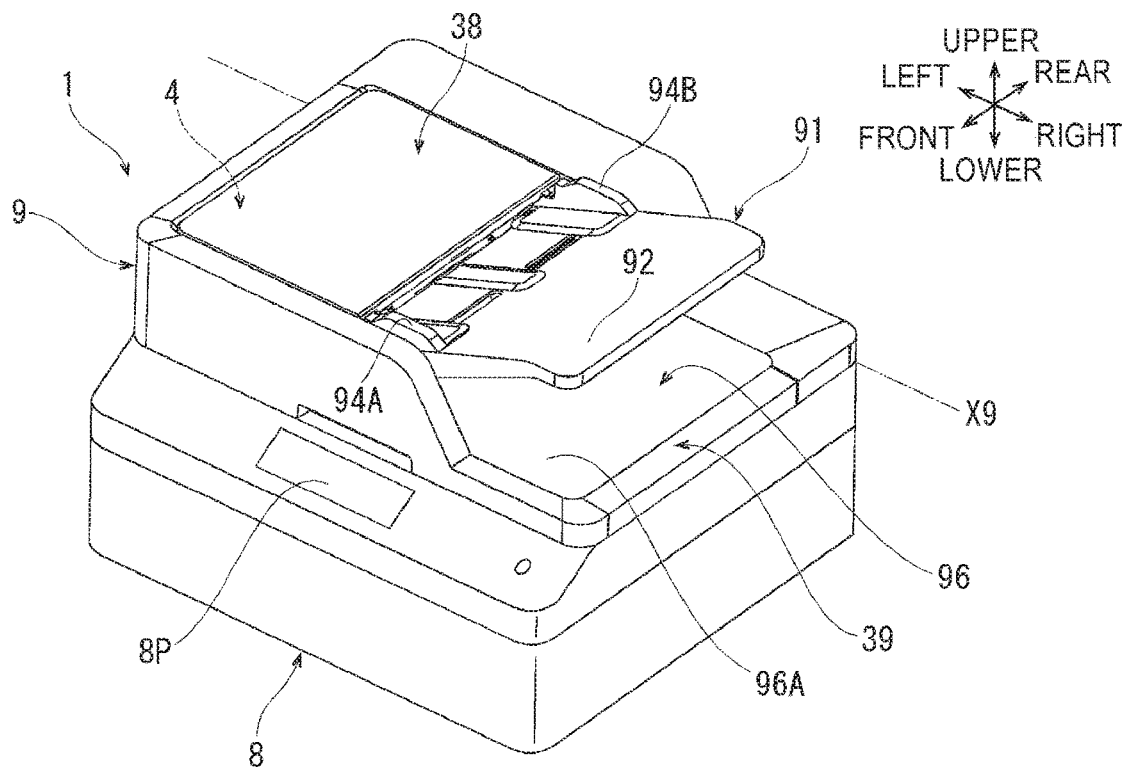
FIG. 1 is a perspective view of an image reading apparatus of a first illustrative embodiment.

FIG. 1 illustrates an image reading apparatus 1 of a first illustrative embodiment of the present invention. In FIG. 1, a side at which an operation panel 8P is provided is defined as the front of the apparatus and a left side of the operation panel 8P is defined as the left, so that the front and rear, right and left and upper and lower directions are respectively shown. The respective directions shown in the respective drawings of FIG. 2 and thereafter are shown in correspondence to the respective directions shown in FIG. 1. In the below, the respective constitutional elements of the image reading apparatus 1 are described with reference to FIG. 1 and the like.

<Overall Configuration>

As shown in FIGS. 1 to 4, the image reading apparatus 1 includes a main body part 8, an opening/closing part 9, an image forming unit 5, a reading unit 3, an automatic conveyance mechanism 4 and a controller 7. The main body part 8 is a substantially flat box-shaped member. As shown in FIG. 1, a front face of the main body part 8 is provided with an operation panel 8P, which is a touch panel or the like.

Figure 2:
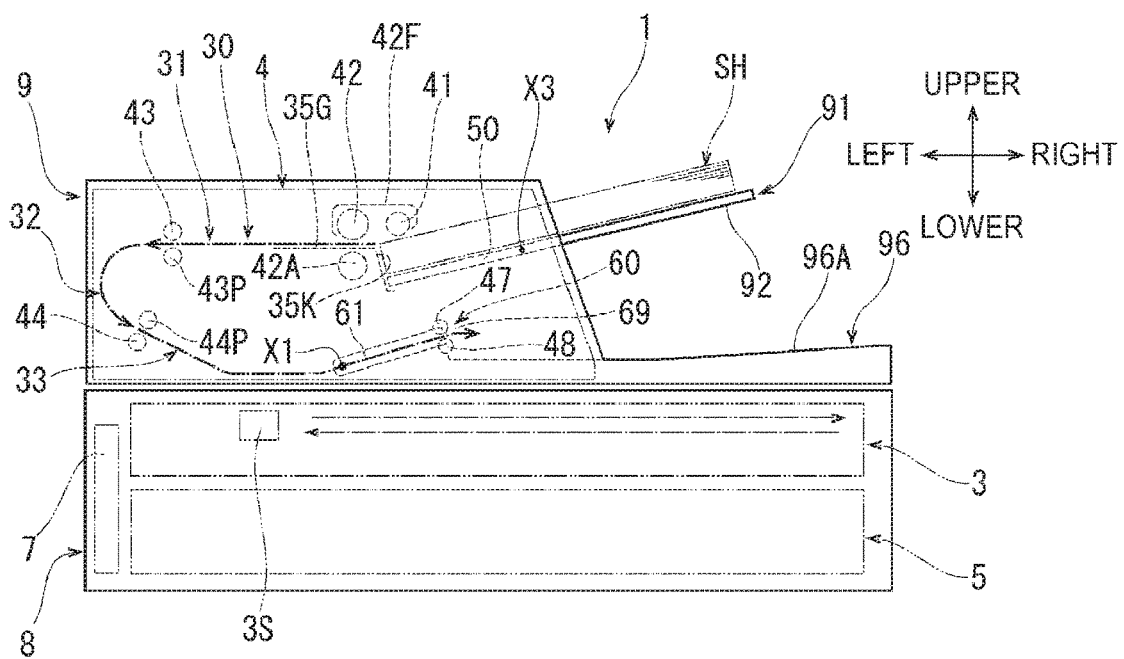
FIG. 2 is a schematic front view of the image reading apparatus of the first illustrative embodiment.
Figure 5:
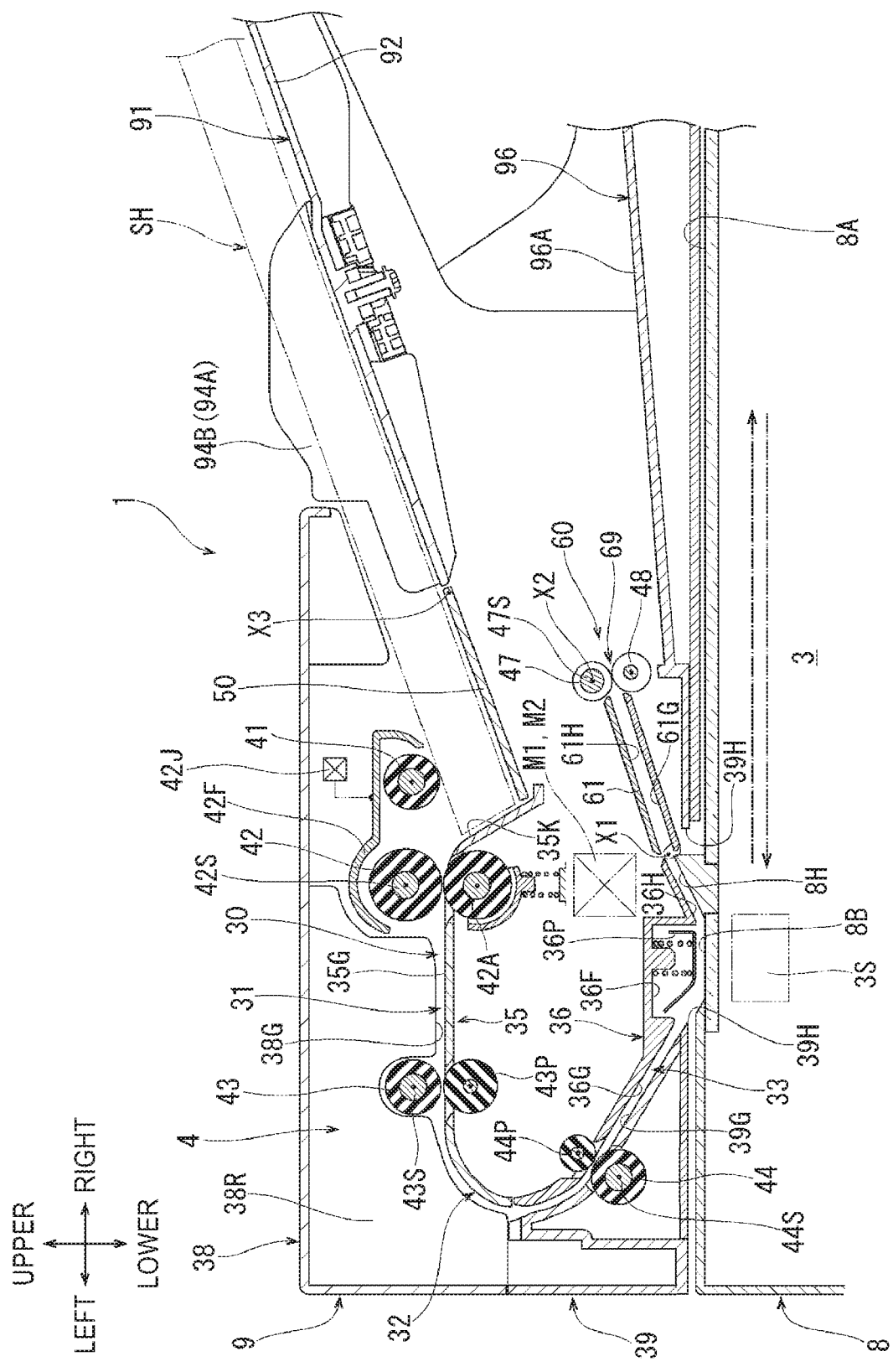
FIG. 5 is a partial sectional view of the image reading apparatus of the first illustrative embodiment.

As shown in FIG. 2, the image forming unit 5 is accommodated at a lower part in the main body part 8. The image forming unit 5 is configured to form an image on a sheet by an inkjet or laser method. As shown in FIGS. 2 and 5, the reading unit 3 is located at an upper part in the main body part 8. The reading unit 3 is configured to read an image on a sheet or a document. The automatic conveyance mechanism 4 is provided to the opening/closing part 9. The automatic conveyance mechanism 4 is configured to sequentially convey sheets SH supported on a supply tray 91 along a conveyance guide when the reading unit 3 reads an image on a sheet SH.

Figures 3, 4:
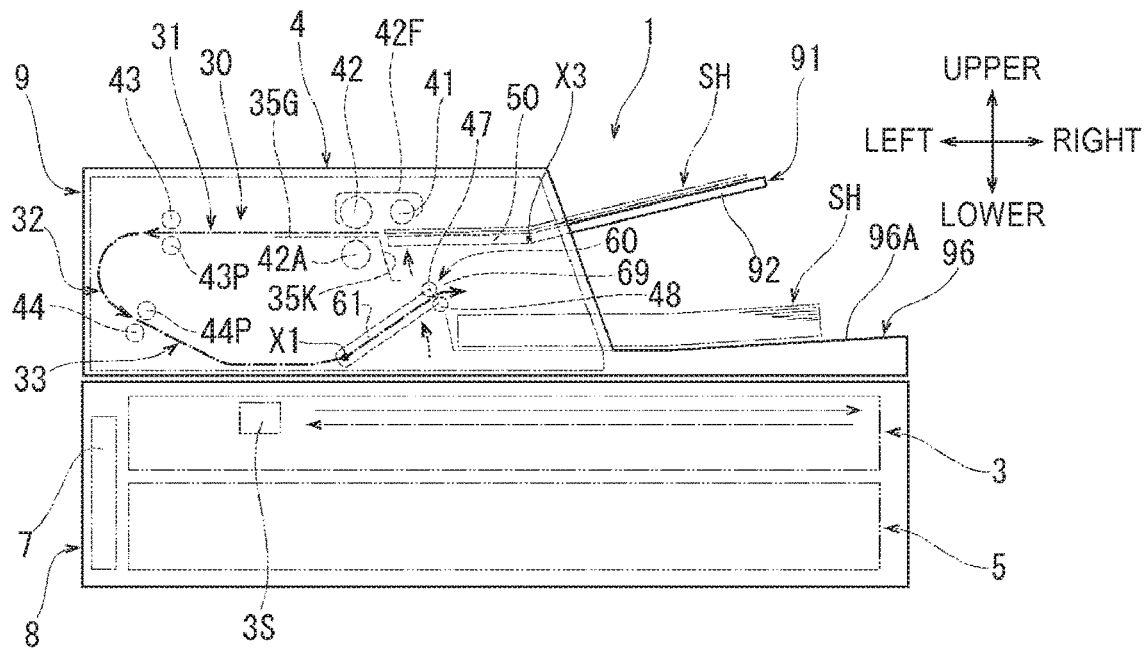
FIG. 3 is a schematic front view of the image reading apparatus of the first illustrative embodiment.
FIG. 4 is a block diagram of the image reading apparatus of the first illustrative embodiment.

As shown in FIGS. 2 and 4, the controller 7 is accommodated at a position along a left surface in the main body part 8. The controller 7 is configured by a microcomputer having a CPU, a ROM and a RAM as main parts. The ROM stores a program with which the CPU controls various operations of the image reading apparatus 1, a program with which the CPU executes identification processing, and the like. The RAM is used as a storage area which temporarily stores data and signals to be used when the CPU executes the programs or a work area of data processing. The controller 7 is configured to control the image forming unit 5, the reading unit 3, the automatic conveyance mechanism 4 and the operation panel 8P.

As shown in FIG. 5, a platen glass is provided on an upper surface of the main body part 8, and a large-area document support surface 8A is formed by an upper surface of the platen glass. A separate platen glass is provided at the left of the document support surface 8A on the upper surface of the main body part 8, and a reading surface 8B extending in the front and rear direction is formed by an upper surface of the separate platen glass.

When the reading unit 3 reads an image on a stationary document, the document support surface 8A supports the document from below. The document to be read may include a sheet such as an OH sheet, a book and the like.

When the reading unit 3 reads an image on the sheet SH which is conveyed one by one by the automatic conveyance mechanism 4, the reading surface 8B contacts the sheet SH from below. A guide convex part 8H is provided between the document support surface 8A and the reading surface 8B on the upper surface of the main body part 8. The guide convex part 8H is configured to pickup and guide the sheet SH, which is conveyed with contacting the reading surface 8B, in a rightward upward sloped direction.

In the first illustrative embodiment, an object of which an image is to be read using the document support surface 8A is referred to as a document, and an object of which an image is to be read with being conveyed by the automatic conveyance mechanism 4 is referred to as a sheet. The document and the sheet may be substantially the same.

As shown in FIG. 1, the opening/closing part 9 is supported to be swingable about an opening/closing shaft axis X9 extending in the right and left direction by a hinge (not shown) arranged at a rear end portion of the main body part 8. In a closed state shown in FIGS. 1, 5 and the like, the opening/closing part 9 is configured to cover the document support surface 8A and the reading surface 8B from above. Although not shown, the opening/closing part 9 is configured to swing about the opening/closing shaft axis X9 such that a front end portion thereof is to be displaced upward and rearward, so as to move to an open position at which the document support surface 8A and the reading surface 8B are exposed. Accordingly, a user can place a document to be read on the document support surface 8A.

Herein, when describing a configuration, an internal structure and the like of the opening/closing part 9, the upper and lower direction and the front and rear direction are described based on a posture of the opening/closing part 9 in the closed state.

As shown in FIGS. 2 to 6, the reading unit 3 includes a reading sensor 3S accommodated at an upper part in the main body part 8, a scanning mechanism drive source 3M shown in FIG. 4, and a scanning mechanism (not shown) configured to be driven by the scanning mechanism drive source 3M. The reading sensor 3S may include a known image reading sensor such as a Contact Image Sensor (CIS), a Charge Coupled Device (CCD) or the like.

As shown in FIG. 5, the reading sensor 3S is located below the document support surface 8A and the reading surface 8B. The scanning mechanism (not shown) is driven by the scanning mechanism drive source 3M when reading the image on the document supported on the document support surface 8A and reciprocally moves the reading sensor 3S in the right and left direction below the document support surface 8A in the main body part 8. Also, the scanning mechanism (not shown) is driven by the scanning mechanism drive source 3M when the reading sensor 3S reads the image on the sheet SH, which is conveyed by the automatic conveyance mechanism 4 and stops the reading sensor 3S at a position below the reading surface 8B in the main body part 8. The position at which the reading sensor 3S is stopped below the reading surface 8B is a preset stationary reading position.

Figure 6:
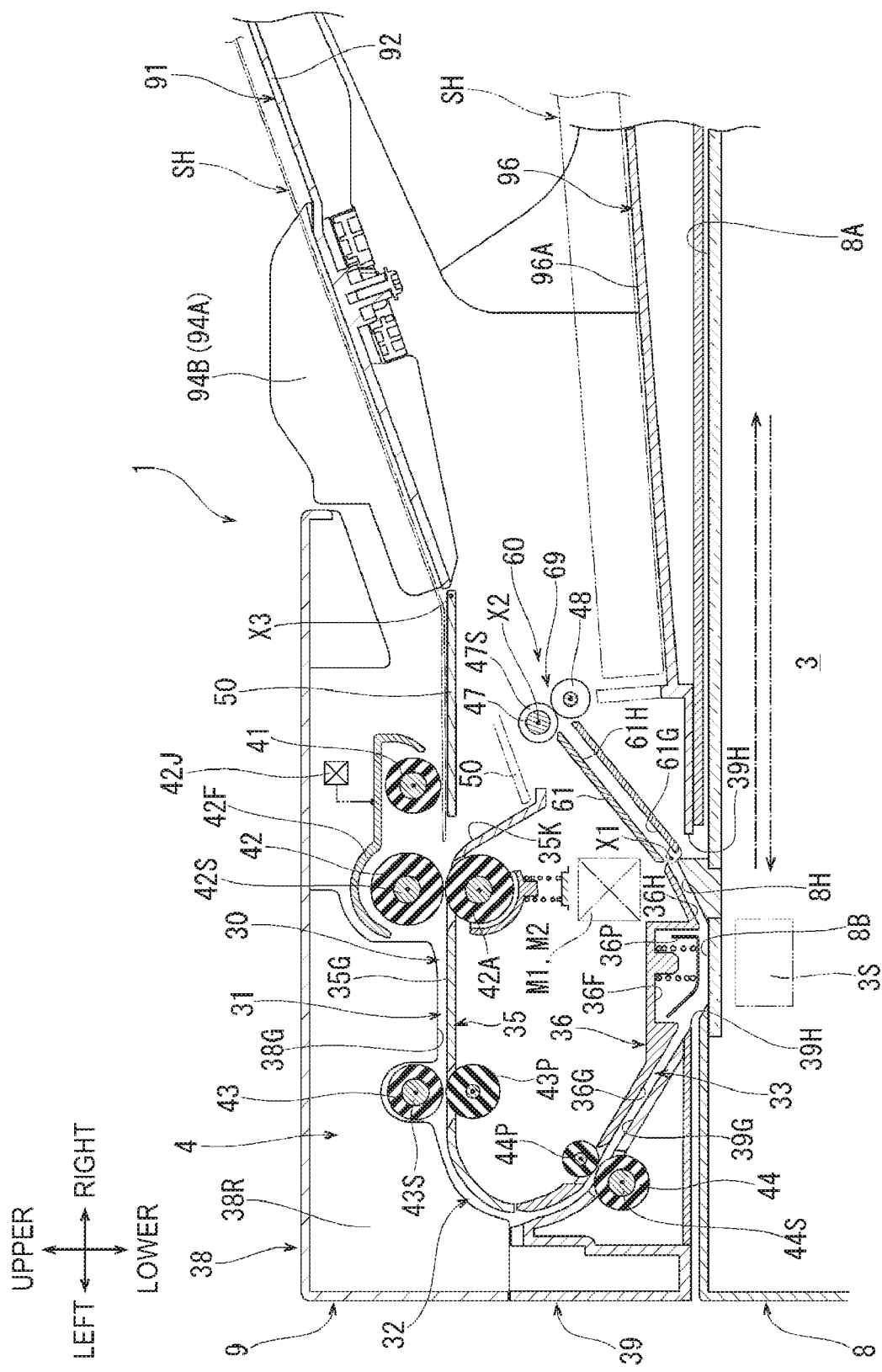
FIG. 6 is a partial sectional view of the image reading apparatus of the first illustrative embodiment.

As shown in FIGS. 5 and 6, the opening/closing part 9 includes a base member 39, a first chute member 35, a second chute member 36 and a cover member 38.

The base member 39 forms a bottom wall of the opening/closing part 9. The base member 39 has a rectangular hole 39H formed by cutting an area, which faces the reading surface 8B and the guide convex part 8H, into a substantially rectangular shape. A part located at the left of the rectangular hole 39H of the base member 39 has a conveyance surface 39G. A left end portion of the conveyance surface 39G is curved so as to be sloped downward and rightward with changing a direction thereof from a downward direction. The conveyance surface 39G is sloped downward up to a left end edge of the rectangular hole 39H.

The second chute member 36 is provided at a left upper part of the base member 39. The second chute member 36 has a pressing member holding part 36F and guide surfaces 36G, 36H. The pressing member holding part 36F is a concave part, which is concave upward at a position facing the reading surface 8B. A pressing member 36P is held to be displaceable in the upper and lower direction in the pressing member holding part 36F. The pressing member 36P is configured to press the sheet SH from above, which is conveyed with contacting the reading surface 8B, so as to suppress the sheet SH from floating from the reading surface 8B. The guide surface 36G is located at the left of the pressing member holding part 36F. A left end portion of the guide surface 36G is curved along a left end portion of the conveyance surface 39G of the base member 39. The guide surface 36G is sloped downward and rightward along the downward sloped part of the conveyance surface 39G of the base member 39. The guide surface 36H is located at the right of the pressing member holding part 36F. The guide surface 36H is sloped upward and rightward along the guide convex part 8H of the main body part 8.

The first chute member 35 is provided above the second chute member 36. The first chute member 35 has a regulation surface 35K and a conveyance surface 35G. The regulation surface 35K is sloped upward and leftward from a right end portion of the first chute member 35. The conveyance surface 35G is connected to an upper end of the regulation surface 35K and extends leftward in a substantially horizontal direction. A left end portion of the conveyance surface 35G is curved to change a direction from the leftward direction to a downward direction.

The cover member 38 is provided above the first chute member 35. The cover member 38 has a guide surface 38G configured by lower end edges of a plurality of ribs 38R protruding downward. A right end portion of the guide surface 38G faces the conveyance surface 35G from above at a position offset leftward from a connection part of the regulation surface 35K and the conveyance surface 35G of the first chute member 35. The guide surface 38G extends leftward in the substantially horizontal direction along the conveyance surface 35G of the first chute member 35. A left end portion of the guide surface 38G is curved along the left end portion of the conveyance surface 35G of the first chute member 35.

Figure 7:
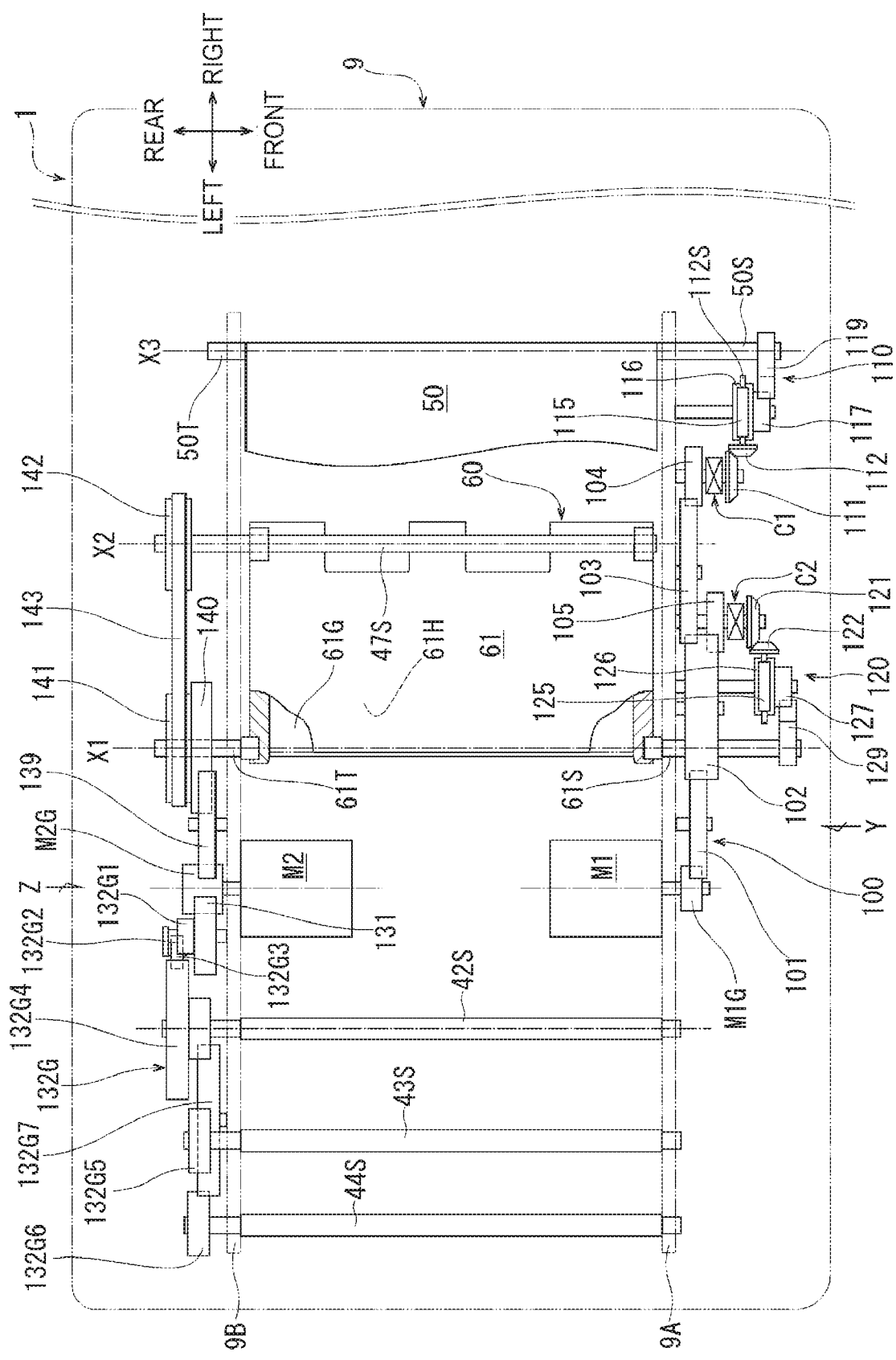
FIG. 7 is a schematic top view of the image reading apparatus of the first illustrative embodiment.
Figure 8:
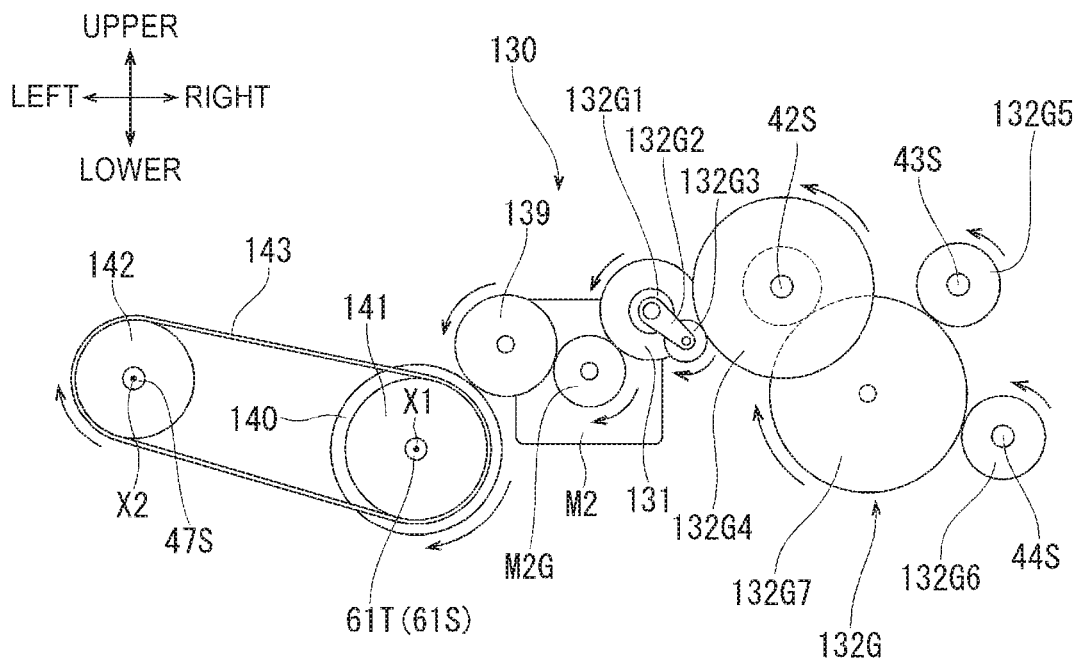
FIG. 8 is a schematic view illustrating a second drive source, a conveyance drive train and the like, as seen from a direction of an arrow Z in FIG. 7.

As shown in FIG. 7, the opening/closing part 9 has a first side frame 9A and a second side frame 9B. The first side frame 9A is provided to extend in the right and left direction at a front face-side of the opening/closing part 9 and configures a part of an internal frame of the opening/closing part 9. The second side frame 9B is provided to extend in the right and left direction at a rear face-side of the opening/closing part 9 and configures a part of the internal frame of the opening/closing part 9. The first side frame 9A and the second side frame 9B face each other in the front and rear direction so as to interpose therebetween the guide surface 38G of the cover member 38, the regulation surface 35K and the conveyance surface 35G of the first chute member 35, the guide surfaces 36G, 36H of the second chute member 36 and the conveyance surface 39G of the base member 39 shown in FIG. 5 and the like. In FIG. 7, for ease of the description, a supply tray main body 92 of the supply tray 91 is not shown and a part of the movable plate 50 is simplified. Also, in FIG. 7, for ease of the description, positions of a first drive source M1 and a second drive source M2 are shown with being offset rightward from a position below a rotary shaft 42S of a separation roller 42. In FIG. 8, the position of the second drive source M2 is shown with being offset rightward from the position below the rotary shaft 42S of the separation roller 42.

As shown in FIGS. 2, 3, 5 and 6, the opening/closing part 9 includes the conveyance guide 30 configuring a part of the automatic conveyance mechanism 4, the supply tray 91 for supporting the sheet SH to be fed to the conveyance guide 30, and a discharge tray 96 for supporting the sheet SH to be discharged from the conveyance guide 30.

As shown in FIG. 5, the supply tray 91 is located at the right of the first chute member 35 and is provided above a right part of the base member 39. The supply tray 91 includes the supply tray main body 92 and the movable plate 50. The supply tray main body 92 is gently sloped downward and leftward from the right end portion-side of the opening/closing part 9. The movable plate 50 is provided to be adjacent to a left end portion of the supply tray main body 92. The movable plate 50 extends in a substantially flat plate shape toward the regulation surface 35K of the first chute member 35. The movable plate 50 is covered from above by a right part of the cover member 38. The supply tray 91 is configured to support the sheet SH, which is to be fed to the automatic conveyance mechanism 4, by the supply tray main body 92 and the movable plate 50.

As shown in FIG. 7, the movable plate 50 has shaft parts 50S, 50T of which shaft axes are a third shaft axis X3 extending in the front and rear direction. The front shaft part 50S is a circular cylinder shaft protruding forward from a front right corner portion of the movable plate 50. The front shaft part 50S is rotatably supported to the first side frame 9A and protrudes forward beyond the first side frame 9A. The rear shaft part 50T is a circular cylinder shaft protruding rearward from a rear right corner portion of the movable plate 50. The rear shaft part 50T is rotatably supported to the second side frame 9B. In this manner, the movable plate 50 is configured to be rotatable about the third shaft axis X3.

Although described later, when the first drive source M1, the upstream-side drive train 100, the first electromagnetic clutch C1 and the first downstream-side drive train 110 shown in FIGS. 7, 9 and the like are operated, the movable plate 50 rotates from a first position shown in FIGS. 2, 5 and 9 to a second position shown in FIGS. 3, 6 and 10 in correspondence to reduction in the number of the sheets SH supported on the supply tray 91. The second position shown in FIG. 6 and the like is a position higher than the first position shown in FIG. 5 and the like.

As shown in FIGS. 1 and 5, two width regulation guides 94A, 94B are provided to be slidable in the front and rear direction on the supply tray main body 92. The front width regulation guide 94A and the rear width regulation guide 94B come close to each other or separate from each other, so that a plurality of types of sheets SH having different sizes and supported on the supply tray 91 are sandwiched in the front and rear direction. Accordingly, it is possible to positionally align the sheets SH having various sizes with reference to a central part of the supply tray 91 in the width direction.

As shown in FIG. 5, the discharge tray 96 is provided at a right part of the base member 39. That is, the discharge tray 96 is provided to overlap the supply tray 91 at a position below the supply tray 91. To the discharge tray 96, the sheet SH of which an image has been read by the reading sensor 3S and which has been conveyed by the automatic conveyance mechanism 4 is discharged. An upper surface of the discharge tray 96 is configured as a sheet support surface 96A for supporting the discharged sheet SH.

The conveyance guide 30 configures a conveyance path for conveying the sheet SH from the supply tray 91 toward the discharge tray 96. Specifically, the conveyance guide 30 includes a first guide 31, a second guide 32 and a third guide 33.

The first guide 31 includes a part which extends in the substantially horizontal direction of the conveyance surface 35G of the first chute member 35, and a part which extends in the substantially horizontal direction of the guide surface 38G of the cover member 38. The first guide 31 is configured to guide leftward the sheet SH to be fed from the supply tray 91.

The second guide 32 includes a curved left end portion of the conveyance surface 35G of the first chute member 35, a curved left end portion of the guide surface 38G of the cover member 38, a curved left end portion of the conveyance surface 39G of the base member 39, and a curved left end portion of the guide surface 36G of the second chute member 36. The second guide 32 connects to the first guide 31 and changes a conveying direction of the sheet SH from a leftward direction to a rightward direction.

The third guide 33 includes a downward sloped part of the conveyance surface 39G of the base member 39, a downward sloped part of the guide surface 36G of the second chute member 36 and the guide surface 36H of the second chute member 36. The third guide 33 connects to the second guide 32 and guides the sheet SH toward the discharge tray 96.

The automatic conveyance mechanism 4 includes a discharge unit 60 for discharging the sheet SH guided by the third guide 33 to the discharge tray 96 by a discharge guide 61. The discharge guide 61 has a conveyance surface 61G and a guide surface 61H. The conveyance surface 61G is located at the right of the guide convex part 8H of the main body part 8 and is sloped upward and rightward. The guide surface 61H is located at the right of the guide surface 36H of the second chute member 36. The guide surface 61H is sloped upward and rightward along the conveyance surface 61G. The discharge guide 61 has a discharge opening 69 for discharging the sheet SH to the discharge tray 96. The discharge opening 69 is opened between a right end portion of the conveyance surface 61G and a right end portion of the guide surface 61H.

As shown in FIG. 7, the discharge guide 61 of the discharge unit 60 is a substantial square tube-shaped member where a flat plate having the conveyance surface 61G formed thereon and a flat plate having the guide surface 61H formed thereon face each other in the upper and lower direction and front end edges and rear end edges of both the flat plates are connected by a pair of front and rear side plates. The discharge guide 61 has shaft parts 61S, 61T of which shaft axes are a first shaft axis X1 extending in the front and rear direction. The first shaft axis X1 is parallel with the third shaft axis X3.

The front shaft part 61S is a circular cylinder shaft protruding forward from front left corner portions of the conveyance surface 61G and the guide surface 61H. The front shaft part 61S is rotatably supported to the first side frame 9A and protrudes forward beyond the first side frame 9A.

The rear shaft part 61T is a circular cylinder shaft protruding rearward from rear left corner portions of the conveyance surface 61G and the guide surface 61H. The rear shaft part 61T is rotatably supported to the second side frame 9B and protrudes rearward beyond the second side frame 9B.

In this manner, the discharge guide 61 is configured to be rotatable about the first shaft axis X1. As shown in FIG. 5, a position of the first shaft axis X1 is set to overlap a conveyance path formed by the third guide 33 of the conveyance guide 30 and the discharge guide 61.

The discharge unit 60 includes a discharge roller 47 and a discharge pinch roller 48. The discharge roller 47 is located above the discharge opening 69. The discharge pinch roller 48 is located below the discharge opening 69. Although not shown, a plurality of sets of discharge rollers 47 and discharge pinch rollers 48 are arranged with intervals in the front and rear direction.

The discharge roller 47 is fixed to a rotary shaft 47S of which a shaft axis is a second shaft axis X2 parallel with the first shaft axis X1. As shown in FIG. 7, a front end portion of the rotary shaft 47S is rotatably supported to a front right corner portion of the discharge guide 61. A rear end portion-side of the rotary shaft 47S is rotatably supported to a rear right corner portion of the discharge guide 61. The rear end portion of the rotary shaft 47S protrudes rearward beyond the discharge guide 61. In this manner, the discharge roller 47 is supported to the discharge guide 61 to be rotatable about the second shaft axis X2.

Figure 9:
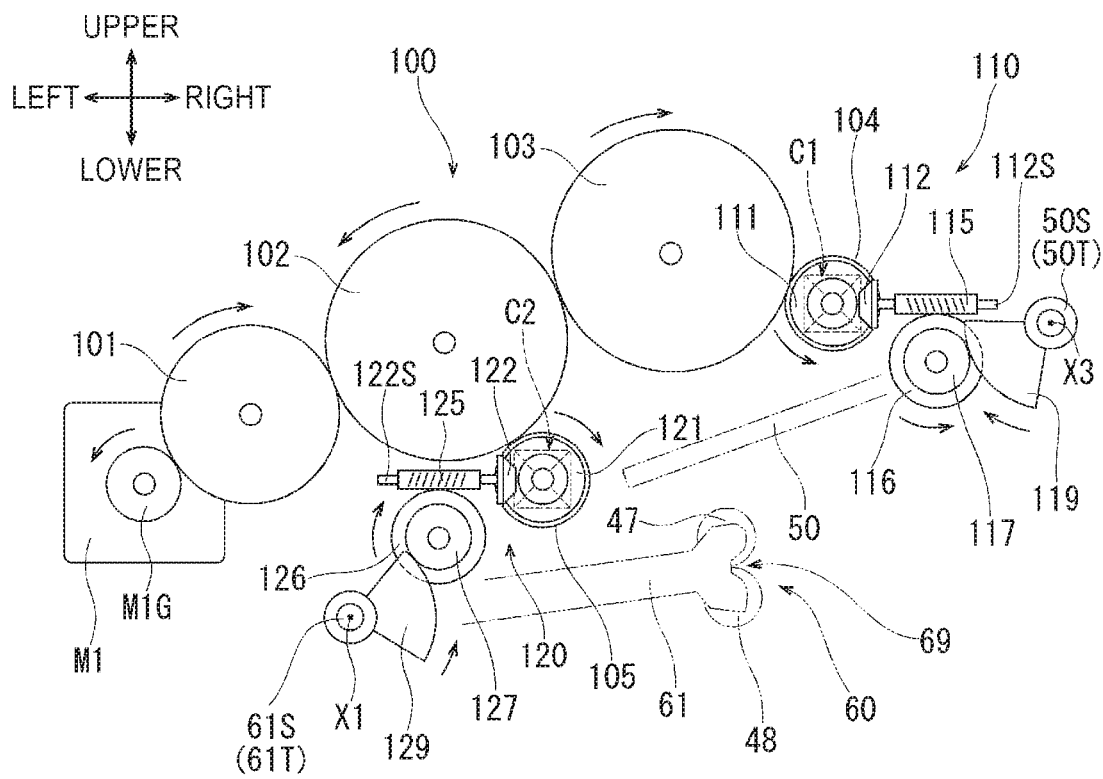
FIG. 9 is a schematic view illustrating a movable plate, a discharge unit, a first drive source, an upstream-side drive train, a first electromagnetic clutch, a second electromagnetic clutch, a first downstream-side drive train and a second downstream-side drive train, as seen from a direction of an arrow Y in FIG. 7, in which the movable plate is located at a first position and the discharge unit is located at a third position.

As shown in FIGS. 5 and 9, the discharge pinch roller 48 is rotatably supported to a right end portion of the discharge guide 61 and faces the discharge roller 47 from below. The conveyance surface 61G and the guide surface 61H of the discharge guide 61 are configured to guide the sheet SH toward a nip position between the discharge roller 47 and the discharge pinch roller 48.

Although described later, when the first drive source M1, the upstream-side drive train 100, the first electromagnetic clutch C1 and the second downstream-side drive train 120 shown in FIGS. 7, 9 and the like are operated, the discharge unit 60 rotates from a third position shown in FIGS. 2, 5 and 9 to a fourth position shown in FIGS. 3, 6 and 10 in correspondence to reduction in the number of the sheets SH supported on the supply tray 91. The fourth position shown in FIG. 6 and the like is a position higher than the third position shown in FIG. 5 and the like.

As shown in FIG. 5, the automatic conveyance mechanism 4 includes a supply roller 41 for conveying the sheet SH along the conveyance guide 30, a separation roller 42, a retard roller 42A, a first conveyance roller 43, a first pinch roller 43P, a second conveyance roller 44, a second pinch roller 44P, the discharge roller 47 and the discharge pinch roller 48. The discharge roller 47 and the discharge pinch roller 48 are parts of the discharge unit 60.

The supply roller 41, the separation roller 42, the first conveyance roller 43, the second conveyance roller 44 and the discharge roller 47 are examples of the conveyance roller.

As shown in FIG. 7, a rotary shaft 42S of the separation roller 42, a rotary shaft 43S of the first conveyance roller 43 and a rotary shaft 44S of the second conveyance roller 44 are rotatably supported to the first side frame 9A and the second side frame 9B. Rear end portions of the rotary shafts 42S, 43S, 44S protrude rearward beyond the second side frame 9B.

As shown in FIGS. 7 and 8, the automatic conveyance mechanism 4 includes a second drive source M2 and a conveyance drive train 130 for driving the supply roller 41, the separation roller 42, the first conveyance roller 43, the second conveyance roller 44 and the discharge roller 47. In the first illustrative embodiment, gear teeth formed on an outer peripheral surface of each of gears configuring the second drive source M2 and the conveyance drive train 130 are not shown in FIGS. 7, 8 and the like.

As shown in FIG. 5, the second drive source M2 is provided between the first guide 31 and the third guide 33. As shown in FIG. 7, the second drive source M2 is attached on a front surface of the second side frame 9B. A drive shaft of the second drive source M2 protrudes rearward beyond the second side frame 9B, and a drive gear M2G is fixed to the drive shaft. In the first illustrative embodiment, the second drive source M2 is a stepping motor. The second drive source M2 is configured to generate a drive force to rotate the drive gear M2G in a clockwise direction in FIG. 8 under control of the controller 7.

As shown in FIGS. 7 and 8, the conveyance drive train 130 is provided at the rear of the second side frame 9B and is supported to a plurality of shaft parts protruding rearward from the second side frame 9B. The conveyance drive train 130 includes a gear 131 positioned at the left and upper of the drive gear M2G and configured to mesh with the drive gear M2G, and a plurality of gear groups 132G configured to transmit a drive force from the second drive source M2 via the gear 131. The plurality of gear groups 132G includes a sun gear 132G1 configured to rotate integrally with the gear 131 and a planetary gear 132G3 coupled to the sun gear 132G1 by an arm 132G2. Further, the plurality of gear groups 132G includes gears 132G4, 132G5, 132G6, 132G7. The gear 132G4 is configured to mesh with the planetary gear 132G3 and to rotate integrally with the rotary shaft 42S of the separation roller 42. The drive force is transmitted from the gear 132G4 to the gear 132G5 via the gear 132G7, so that the gear 132G5 rotates integrally with the rotary shaft 43S of the first conveyance roller 43. The drive force is transmitted from the gear 132G4 to the gear 132G6 via the gear 132G7, so that the gear 132G6 rotates integrally with the rotary shaft 44S of the second conveyance roller 44. In the meantime, when removing the sheet SH jammed in the conveyance guide 30, the planetary gear 132G3 is spaced from the gear 132G4 such that the gears 132G4, 132G5, 132G6 can freely rotate. Accordingly, it is possible to easily remove the jammed sheet SH.

The plurality of gear groups 132G are configured to transmit the drive force from the second drive source M2 to the rotary shaft 42S of the separation roller 42, the rotary shaft 43S of the first conveyance roller 43 and the rotary shaft 44S of the second conveyance roller 44, so as to rotate the separation roller 42, the first conveyance roller 43 and the second conveyance roller 44 in a direction, in which the sheet SH is to be conveyed toward the reading sensor 3S stopped at the stationary reading position, i.e., in a counter-clockwise direction in FIG. 8.

The conveyance drive train 130 includes a gear 139 located at the right of the drive gear M2G and configured to mesh with the drive gear M2G, a gear 140 configured to transmit the drive force from the second drive source M2 to the discharge roller 47 via the gear 139, a first discharge roller drive pulley 141, a timing belt 143 and a second discharge roller drive pulley 142.

The gear 140 and the first discharge roller drive pulley 141 are configured as a single member. The gear 140 and the first discharge roller drive pulley 141 are inserted to be independently rotatable to the rear shaft part 61T of the discharge guide 61. Accordingly, the first discharge roller drive pulley 141 can rotate about the first shaft axis X1 integrally with the gear 140 in mesh with the gear 139. The timing belt 143 is wound on the first discharge roller drive pulley 141 and the second discharge roller drive pulley 142. The second discharge roller drive pulley 142 is fixed to the rear end portion of the rotary shaft 47S of the discharge roller 47. The gears 139, 140, the first discharge roller drive pulley 141, the timing belt 143 and the second discharge roller drive pulley 142 are configured to transmit the drive force from the second drive source M2 to the rotary shaft 47S of the discharge roller 47, so as to rotate the discharge roller 47 in a direction, in which the sheet SH is to be discharged to the discharge tray 96. i.e., a clockwise direction in FIG. 8.

An interval between the first shaft axis X1 of the first discharge roller drive pulley 141 and the second shaft axis X2 of the second discharge roller drive pulley 142 does not change even though the discharge guide 61 is rotated. Therefore, the tension of the timing belt 143 is less likely to vary even though the discharge guide 61 is rotated, so that it is possible to favorably transmit the drive force from the first discharge roller drive pulley 141 to the second discharge roller drive pulley 142.

As shown in FIG. 5, the separation roller 42 is provided at a position offset leftward from the connection part of the regulation surface 35K and the conveyance surface 35G of the first chute member 35.

A holder 42F is rotatably supported to the rotary shaft 42S of the separation roller 42. The holder 42F protrudes rightward beyond the regulation surface 35K, with being spaced from the rotary shaft 42S.

The supply roller 41 is rotatably supported to a right end portion of the holder 42F. The supply roller 41 is provided at a position facing the movable plate 50 from above. The rotary shaft 42S and a transmission gear group (not shown) provided in the holder 42F are configured to transmit the drive force from the second drive source M2 to the supply roller 41, and to rotate the supply roller 41 in the direction in which the sheet SH supported on the supply tray 91 is to be conveyed to the conveyance guide 30. The supply roller 41 can be displaced in the upper and lower direction in association with rotation of the holder 42F.

The opening/closing part 9 is provided with a holder posture detection sensor 42J. The holder posture detection sensor 42J is configured to detect whether a posture of the holder 42F is an appropriate posture shown in FIGS. 5 and 6 and to transmit a detection result to the controller 7. In a state where the holder 42F is at the appropriate posture shown in FIGS. 5 and 6, a lower end of the supply roller 41 is substantially flush with the conveyance surface 35G of the first chute member 35. In this state, the supply roller 41 can favorably feed the uppermost sheet SH of the sheets SH supported on the supply tray 91 toward the conveyance surface 35G, i.e., toward between the separation roller 42 and the retard roller 42A.

The retard roller 42A is supported to the first chute member 35 at a position immediately below the separation roller 42 and is pressed toward the separation roller 42. When one sheet SH is nipped between the separation roller 42 and the retard roller 42A, rotation of the retard roller 42A is permitted by a torque limiter (not shown). On the other hand, when a plurality of sheets SH are nipped between the separation roller 42 and the retard roller 42A, the rotation of the retard roller 42A is stopped by the torque limiter (not shown). Accordingly, the retard roller 42A applies, to a sheet SH except the sheet SH in contact with the separation roller 42, a force of stopping conveyance of the sheet SH.

The first conveyance roller 43 is provided at a connection part of the first guide 31 and the second guide 32 so as to face the conveyance surface 35G of the first chute member 35 from above. The first pinch roller 43P is supported to the first chute member 35 and is pressed toward the first conveyance roller 43. The first conveyance roller 43 and the first pinch roller 43P are configured to nip the sheet SH separated one by one by the separation roller 42 and the retard roller 42A and to convey the same toward the second guide 32.

The second conveyance roller 44 is provided at a connection part of the second guide 32 and the third guide 33 so as to face the guide surface 36G of the second chute member 36 from below. The second pinch roller 44P is supported to the second chute member 36 and is pressed toward the second conveyance roller 44. The second conveyance roller 44 and the second pinch roller 44P are configured to nip the sheet SH conveyed by the first conveyance roller 43 and the first pinch roller 43P and to convey the sheet SH toward the reading surface 8B, i.e., toward the reading sensor 3S stopped at the stationary reading position.

The discharge roller 47 and the discharge pinch roller 48 are configured to nip the sheet SH passing above the reading surface 8B and guided by the discharge guide 61 and to discharge the same from the discharge opening 69 toward the discharge tray 96.

<Configurations of First Drive Source, Upstream-Side Drive Train, First Electromagnetic Clutch, Second Electromagnetic Clutch, First Downstream-Side Drive Train and Second Downstream-Side Drive Train>

As shown in FIGS. 7, 9 and the like, the automatic conveyance mechanism 4 includes the first drive source M1, the upstream-side drive train 100, the first electromagnetic clutch C1, the second electromagnetic clutch C2, the first downstream-side drive train 110 and the second downstream-side drive train 120 and is configured to perform rotating operations of the movable plate 50 and the discharge unit 60. The first drive source M1 is an example of the drive source configured to drive the movable plate and the discharge unit. In the first illustrative embodiment, in FIGS. 7, 9 and the like, gear teeth formed on an outer peripheral surface of each of gears configuring the first drive source M1, the upstream-side drive train 100, the first downstream-side drive train 110 and the second downstream-side drive train 120 are not shown.

As shown in FIG. 5, the first drive source M1 is provided between the first guide 31 and the third guide 33. As shown in FIG. 7, the first drive source M1 is attached to a rear surface of the first side frame 9A. A drive shaft of the first drive source M1 protrudes forward beyond the first side frame 9A, and the drive gear M1G is fixed to the drive shaft. In the first illustrative embodiment, the first drive source M1 is a stepping motor. The first drive source M1 is configured to generate a drive force to rotate the drive gear M1G in the clockwise and counterclockwise directions in FIGS. 9 and 10 under control of the controller 7.

Figure 10:
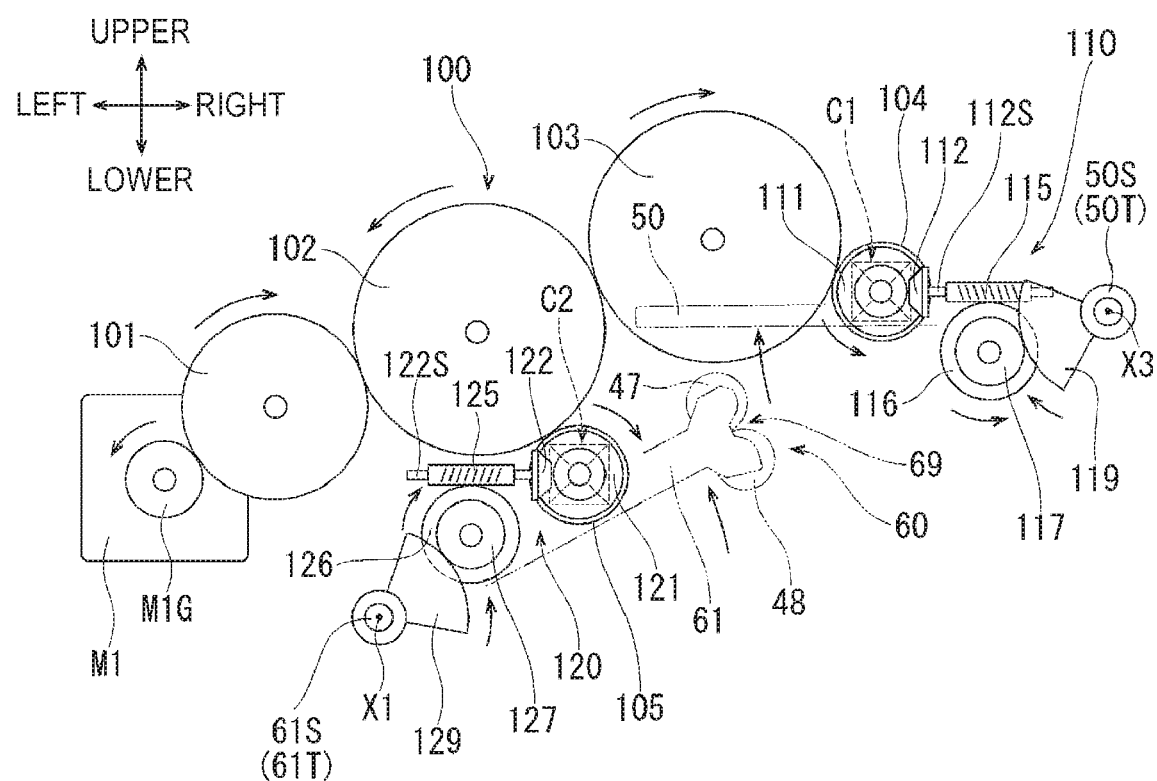
FIG. 10 is a schematic view similar to FIG. 9, illustrating a state where the movable plate is moved to a second position and a discharge unit is moved to a fourth position.

A plurality of arrows shown in FIGS. 9 and 10 indicate rotating directions when the drive gear M1G rotates in the counterclockwise direction in FIGS. 9 and 10 and the first electromagnetic clutch C1 and the second electromagnetic clutch C2 are respectively in a connection state. On the other hand, when the drive gear M1G rotates in the clockwise direction in FIGS. 9 and 10, the rotating directions are opposite to the respective arrows shown in FIGS. 9 and 10.

As shown in FIGS. 7 and 9, the upstream-side drive train 100, the first electromagnetic clutch C1, the second electromagnetic clutch C2, the first downstream-side drive train 110 and the second downstream-side drive train 120 are provided in front of the first side frame 9A and are supported to the plurality of shaft parts protruding forward from the first side frame 9A.

The upstream-side drive train 100 includes gears 101, 102, 103, 104, 105. The gear 101 is located at the right and upper of the drive gear M1G and is in mesh with the drive gear M1G. The gear 102 is located at the right and upper of the gear 101 and is in mesh with the gear 101. The gear 103 is located at the right and upper of the gear 102 and is in mesh with the gear 102.

The gear 104 is located at the right and lower of the gear 103 and is in mesh with the gear 103. The gear 104 is connected to an input-side of the first electromagnetic clutch C1. The gear 105 is located at the right and lower of the gear 102 and is in mesh with the gear 102. The gear 105 is connected to an input-side of the second electromagnetic clutch C2.

As shown in FIG. 4, the first electromagnetic clutch C1 and the second electromagnetic clutch C2 are controlled by the controller 7. The first electromagnetic clutch C1 and the second electromagnetic clutch C2 include a solenoid (not shown), which is to move under control of the controller 7, and a clutch mechanism (not shown) configured to switch between a connection state and a disconnection state as the solenoid operates, respectively. As the clutch mechanism, a known configuration may be employed such as a configuration where clutch plates contact each other or are spaced from each other, a configuration where rotation of some of a gear group including a planetary gear is permitted or restrained, and the like.

As shown in FIGS. 7 and 9, the first downstream-side drive train 110 includes a bevel gear 111, a bevel gear 112, a worm gear 115, a worm wheel gear 116, a gear 117 and a fan-shaped gear 119. The bevel gear 111 is connected to an output-side of the first electromagnetic clutch C1. A rotary shaft 112S of the bevel gear 112 extends in the right and left direction perpendicular to a rotary shaft of the bevel gear 111. The bevel gear 112 is located at the right and front of the bevel gear 111 and is in mesh with the bevel gear 111.

The worm gear 115 is fixed to the rotary shaft 112S extending rightward from the bevel gear 112 and is configured to be rotatable integrally with the bevel gear 112. The worm wheel gear 116 and the gear 117 are configured as a single component. A rotary shaft of the worm wheel gear 116 and the gear 117 extends in the front and rear direction in parallel with the third shaft axis X3. The worm wheel gear 116 is located at the lower of the worm gear 115 and is in mesh with the worm gear 115. The gear 117 is provided at a front face-side of the worm wheel gear 116 and has a diameter smaller than the worm wheel gear 116. The fan-shaped gear 119 is fixed to the front shaft part 50S of the movable plate 50. The fan-shaped gear 119 is located at the right and upper of the gear 117 and is in mesh with the gear 117. When the fan-shaped gear 119 rotates, the movable plate 50 rotates integrally with the fan-shaped gear 129.

The second downstream-side drive train 120 includes a bevel gear 121, a bevel gear 122, a worm gear 125, a worm wheel gear 126, a gear 127 and a fan-shaped gear 129. The bevel gear 121 is connected to an output-side of the second electromagnetic clutch C2. A rotary shaft 122S of the bevel gear 122 extends in the right and left direction perpendicular to a rotary shaft of the bevel gear 121. The bevel gear 122 is located at the left and front of the bevel gear 121 and is in mesh with the bevel gear 121.

The worm gear 125 is fixed to the rotary shaft 122S extending leftward from the bevel gear 122 and is configured to be rotatable integrally with the bevel gear 122. The worm wheel gear 126 and the gear 127 are configured as a single component. A rotary shaft of the worm wheel gear 126 and the gear 127 extends in the front and rear direction in parallel with the first shaft axis X1. The worm wheel gear 126 is located at the lower of the worm gear 125 and is in mesh with the worm gear 125. The gear 127 is provided at a front face-side of the worm wheel gear 126 and has a diameter smaller than the worm wheel gear 126. The fan-shaped gear 129 is fixed to the front shaft part 61S of the discharge guide 61. The fan-shaped gear 129 is located at the left and lower of the gear 127 and is in mesh with the gear 127. When the fan-shaped gear 129 rotates, the discharge guide 61 and the discharge roller 47 and discharge pinch roller 48 supported to the discharge guide 61 rotate integrally with the fan-shaped gear 129.

Subsequently, operations of the first downstream-side drive train 110 are described. When the first electromagnetic clutch C1 is in the disconnection state, the movable plate 50 tends to move downward by its own weight but the force at that time is transmitted to the worm gear 115 and the worm wheel gear 116, so that the worm gear 115 and the worm wheel gear 116 are self-locked. Therefore, the movable plate 50 coupled to the first electromagnetic clutch C1 via the worm gear 115 and the worm wheel gear 116 is kept at the position without moving downward.

In a state where the first drive source M1 rotates the drive gear M1G in the counterclockwise direction in FIG. 9 under control of the controller 7, when the first electromagnetic clutch C1 is in the connection state, the first downstream-side drive train 110 transmits the drive force from the first drive source M1 to the movable plate 50 by operations of the bevel gear 111, the bevel gear 112, the worm gear 115, the worm wheel gear 116, the gear 117 and the fan-shaped gear 119. Accordingly, as shown in FIG. 10, the movable plate 50 rotates about the third shaft axis X3 so as to displace upward the left end portion thereof, so that the movable plate 50 is moved from the first position shown in FIG. 5 and the like to the second position shown in FIG. 6 and the like.

On the other hand, in a state where the first drive source M1 rotates the drive gear M1G in the clockwise direction in FIG. 9 under control of the controller 7, when the first electromagnetic clutch C1 is in the connection state, the first downstream-side drive train 110 transmits the drive force from the first drive source M1 to the movable plate 50 by reverse operations of the bevel gear 111, the bevel gear 112, the worm gear 115, the worm wheel gear 116, the gear 117 and the fan-shaped gear 119. Accordingly, as shown in FIG. 9, the movable plate 50 rotates about the third shaft axis X3 so as to displace downward the left end portion thereof, so that the movable plate 50 is moved from the second position shown in FIG. 6 and the like to the first position shown in FIG. 5 and the like.

Subsequently, operations of the second downstream-side drive train 120 are described. When the second electromagnetic clutch C2 is in the disconnection state, the discharge unit 60 tends to move downward by its own weight but the force at that time is transmitted to the worm gear 125 and the worm wheel gear 126, so that the worm gear 125 and the worm wheel gear 126 are self-locked. Therefore, the discharge unit 60 coupled to the second electromagnetic clutch C2 via the worm gear 125 and the worm wheel gear 126 is kept at the position without moving downward.

In a state where the first drive source M1 rotates the drive gear M1G in the counterclockwise direction in FIG. 9 under control of the controller 7, when the second electromagnetic clutch C2 is in the connection state, the second downstream-side drive train 120 transmits the drive force from the first drive source M1 to the discharge unit 60 by operations of the bevel gear 121, the bevel gear 122, the worm gear 125, the worm wheel gear 126, the gear 127 and the fan-shaped gear 129. Accordingly, as shown in FIG. 10, the discharge unit 60 rotates about the first shaft axis X1 so as to displace upward the discharge opening 69, so that the discharge unit 60 is moved from the third position shown in FIG. 5 and the like to the fourth position shown in FIG. 6 and the like.

On the other hand, in a state where the first drive source M1 rotates the drive gear M1G in the clockwise direction in FIG. 9 under control of the controller 7, when the second electromagnetic clutch C2 is in the connection state, the second downstream-side drive train 120 transmits the drive force from the first drive source M1 to the discharge unit 60 by reverse operations of the bevel gear 121, the bevel gear 122, the worm gear 125, the worm wheel gear 126, the gear 127 and the fan-shaped gear 129. Accordingly, as shown in FIG. 9, the discharge unit 60 rotates about the first shaft axis X1 so as to displace downward the discharge opening 69, so that the discharge unit 60 is moved from the fourth position shown in FIG. 6 and the like to the third position shown in FIG. 5 and the like.

As shown in FIG. 5, in the state where the movable plate 50 is located at the first position, the left end portion of the movable plate 50 is located at a position facing a lower end portion of the regulation surface 35K of the first chute member 35, and an inclination angle of the upper surface of the movable plate 50 is substantially the same as an inclination angle of the upper surface of the supply tray main body 92. In this state, the supply tray 91 can support the maximum number of sheets SH. When the movable plate 50 is located at the first position and the supply roller 41 is contacted to the uppermost sheet SH of the maximum number of sheets SH, the holder 42F is at an appropriate posture shown in FIG. 5.

As shown in FIG. 6, in the state where the movable plate 50 is located at the second position, the left end portion of the movable plate 50 is located at a position facing an upper end portion of the regulation surface 35K of the first chute member 35 and the upper surface of the movable plate 50 extends in the substantially horizontal direction at a height that is substantially flush with the conveyance surface 35G of the first chute member 35. In this state, the supply tray 91 supports one to several sheets SH. When the movable plate 50 is located at the second position and the supply roller 41 is contacted to the uppermost sheet SH of one to several sheets SH, the holder 42F is at an appropriate posture shown in FIG. 6.

As shown in FIG. 5, in the state where the discharge unit 60 is located at the third position, the discharge opening 69, the discharge roller 47 and the discharge pinch roller 48 are located at positions close to the sheet support surface 96A of the discharge tray 96. This state of the discharge unit 60 corresponds to a case where the number of sheets SH supported on the sheet support surface 96A of the discharge tray 96 is small.

As shown in FIG. 6, in the state where the discharge unit 60 is located at the fourth position, the discharge opening 69, the discharge roller 47 and the discharge pinch roller 48 are located at positions spaced upward from the sheet support surface 96A of the discharge tray 96. This state of the discharge unit 60 corresponds to a case where the maximum number of sheets SH are supported on the sheet support surface 96A of the discharge tray 96. That is, in this state, the discharge opening 69 of the discharge unit 60 is sufficiently spaced upward from the uppermost sheet SH of the maximum number of sheets SH supported on the sheet support surface 96A.

As described in detail with reference to a timing chart of FIG. 11, when the controller 7 controls the rotating operations of the movable plate 50 and the discharge unit 60 so as to execute an image forming operation, the controller 7 operates the first drive source M1 in advance, so as to rotate the drive gear M1G in the counterclockwise direction in FIG. 9.

When it is determined based on the detection signal of the holder posture detection sensor 42J that the posture of the holder 42F is lowered from the appropriate posture shown in FIGS. 5 and 6 beyond an allowable range, the controller 7 switches the first electromagnetic clutch C1 to the connection state. Then, the controller 7 gradually rotates the movable plate 50 from the first position shown in FIG. 5 and the like toward the second position shown in FIG. 6 and the like, so as to control the holder 42F to keep the appropriate posture shown in FIGS. 5 and 6.

At this time, the controller 7 determines first timings T1A, T1B and the like, which will be described in detail with reference to the timing chart of FIG. 11, and switches the first electromagnetic clutch C1 between the connection state and the disconnection state. Also, at this time, the controller 7 may minutely control the disconnection/connection of the first electromagnetic clutch C1 to finely change the rotating posture of the fan-shaped gear 119, so as to positionally determine the movable plate 50 at a desired rotating posture with high precision.

The controller 7 appropriately switches the second electromagnetic clutch C2 to the connection state in correspondence to an increase in angle at which the movable plate 50 rotates from the first position shown in FIG. 5 and the like toward the second position shown in FIG. 6 and the like. Then, the controller 7 gradually rotates the discharge unit 60 from the third position shown in FIG. 5 and the like toward the fourth position shown in FIG. 6 and the like so that the discharge unit is to come close to an empty space after the movable plate 50 has rotated, and controls the discharge opening 69 to be located at the appropriate height with respect to the sheet support surface 96A of the discharge tray 96.

At this time, the controller 7 determines second timings T2A, T2B and the like, which will be described in detail with reference to the timing chart of FIG. 11, and switches the second electromagnetic clutch C2 between the connection state and the disconnection state. Also, at this time, the controller 7 may minutely control the disconnection/connection of the second electromagnetic clutch C2 to finely change the rotating posture of the fan-shaped gear 129, so as to positionally determine the discharge unit 60 at a desired rotating posture with high precision.

When returning the movable plate 50 to the first position shown in FIG. 5 and the like and the discharge unit 60 to the third position shown in FIG. 5 and the like upon activation or upon ending of the image forming operation, the controller 7 operates the first drive source M1 in advance, so as to rotate the drive gear M1G in the clockwise direction in FIG. 9. Then, the controller 7 appropriately switches the first electromagnetic clutch C1 and the second electromagnetic clutch C2 to the connection state, so as to control the rotations of the movable plate 50 and the discharge unit 60.

The image reading apparatus 1 can be size-reduced in the upper and lower direction by the configuration where the discharge unit 60 rotates in correspondence to the rotation of the movable plate 50 of the supply tray 91.

<Image Reading Operation>

In the image reading apparatus 1, when reading an image on a document supported on the document support surface 8A, the controller 7 controls the scanning mechanism drive source 3M of the reading unit 3 to operate the scanning mechanism (not shown), so as to move the reading sensor 3S between a reading start position below a left end edge of the document support surface 8A and a reading end position below a right end edge. Accordingly, the reading sensor 3S reads the image on the document supported on the document support surface 8A. Thereafter, the controller 7 controls the scanning mechanism drive source 3M of the reading unit 3 to operate the scanning mechanism (not shown) in a reverse direction, so as to move the reading sensor 3S having completed the reading from the right end to the left end in the reading unit 3 and returning the same to a standby position.

In the image reading apparatus 1, when conveying the sheet SH supported on the supply tray 91 by the automatic conveyance mechanism 4 and reading the image on the sheet SH, the controller 7 controls the scanning mechanism drive source 3M of the reading unit 3 to operate the scanning mechanism (not shown), so as to stop the reading sensor 3S at the stationary reading position below the reading surface 8B. Here, it is assumed that the movable plate 50 is located at the first position shown in FIG. 5 and the like, the discharge unit 60 is located at the third position shown in FIG. 5 and the like and the sheet SH is not supported on the discharge tray 96.

Subsequently, the controller 7 executes the image reading operation and the rotating operations of the movable plate 50 and the discharge unit 60, in accordance with a timing chart exemplified in FIG. 11.

Figure 11:
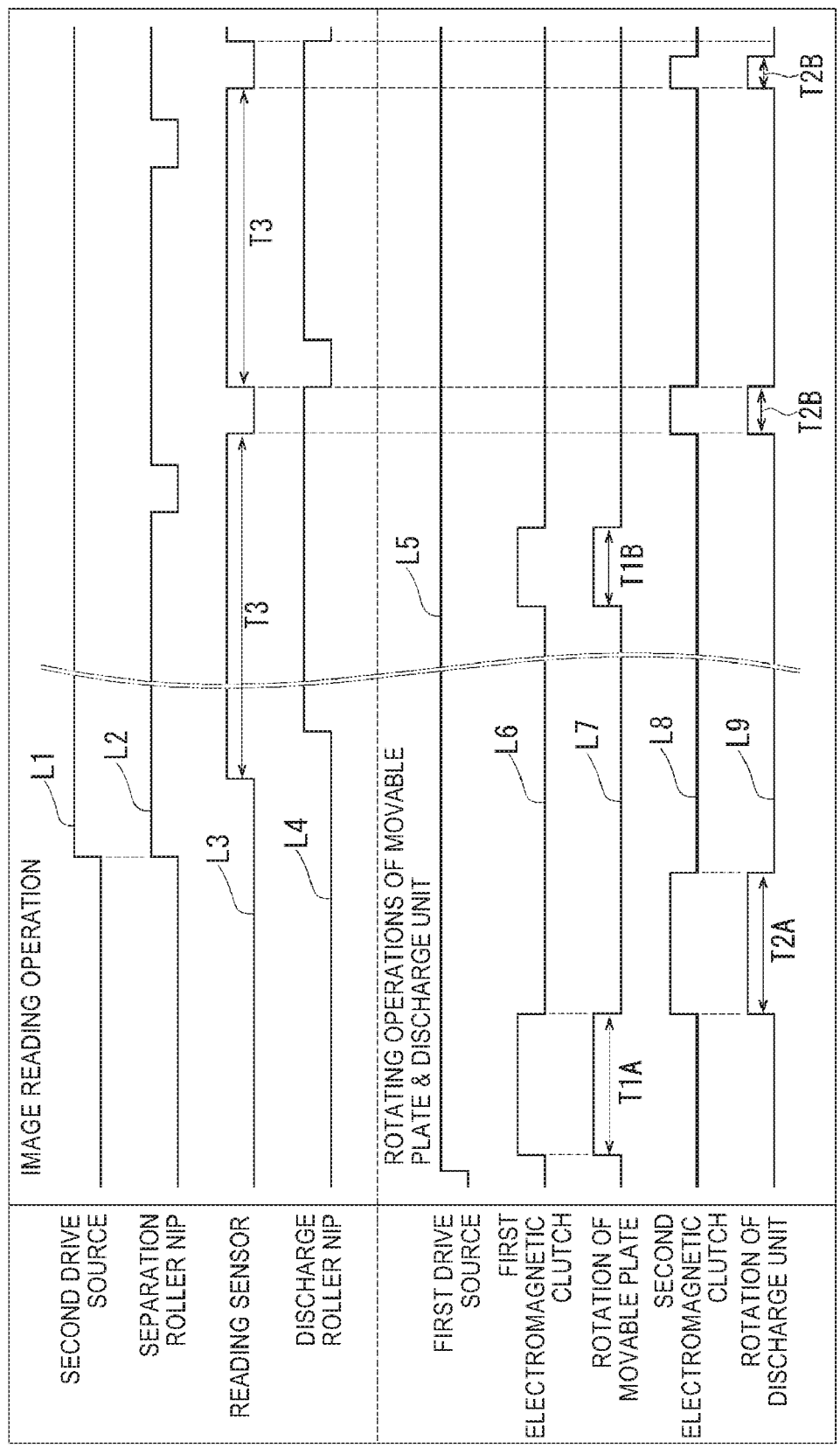
FIG. 11 relates to the image reading apparatus of the first illustrative embodiment, illustrating a timing chart for showing an image reading operation and rotating operations of the movable plate and the discharge unit.

As shown with a polygonal line L5 in FIG. 11, the controller 7 operates the first drive source M1 to rotate the drive gear M1G in the counterclockwise direction in FIG. 9. In the first illustrative embodiment, the first drive source M1 is kept in this state until the image forming operation is completed. In the meantime, the controller 7 may stop the first drive source M1 for a time period in which it is clear that the operations of the movable plate 50 and the discharge unit 60 are not executed.

Then, the controller 7 determines whether the holder 42F is at the appropriate posture shown in FIGS. 5 and 6, based on the detection signal of the holder posture detection sensor 42J. When it is determined that the holder 42F is not at the appropriate posture shown in FIGS. 5 and 6, the controller 7 switches the first electromagnetic clutch C1 to the connection state and operates the first downstream-side drive train 110, as shown with polygonal lines L6, L7 in FIG. 11.

Then, the controller 7 rotates the movable plate 50 from the first position shown in FIG. 5 and the like toward the second position shown in FIG. 6 and the like, places the holder 42F to the appropriate posture shown in FIGS. 5 and 6 and then switches the first electromagnetic clutch C1 to the disconnection state. At this time, the timing after the movable plate 50 starts to rotate until the rotation is over is referred to as a first timing T1A.

Subsequently, the controller 7 determines an angle at which the discharge unit 60 is to rotate in correspondence to an increase in angle at which the movable plate 50 rotates from the first position shown in FIG. 5 and the like toward the second position shown in FIG. 6 and the like. Then, as shown with polygonal lines L8, L9 in FIG. 11, the controller 7 switches the second electromagnetic clutch C2 to the connection state and operates the second downstream-side drive train 120. Then, the controller 7 rotates the discharge unit 60 from the third position shown in FIG. 5 and the like toward the fourth position shown in FIG. 6 and the like by a necessary amount and then switches the second electromagnetic clutch C2 to the disconnection state. At this time, the timing after the discharge unit 60 starts to rotate until the rotation is over is referred to as a second timing T2A.

As can be seen from the comparison with the polygonal lines L7, L9 in FIG. 11, the first timing T1A for which the movable plate 50 rotates and the second timing T2A for which the discharge unit 60 rotates are totally different, and the second timing T2A is later than the first timing T1A.

In the meantime, for example, when it is less necessary to keep a difference between a moving amount of the movable plate 50 and a moving amount of the discharge unit 60 small, the controller 7 may rotate only the movable plate 50 and keep the discharge unit 60 stationary before starting the conveyance of the sheet SH. In this case, a part corresponding to the second timing T2A of the polygonal line L9 in FIG. 11 may be removed.

Then, the controller 7 operates the second drive source M2, as shown with a polygonal line L1 in FIG. 11. Then, the conveyance drive train 130 transmits the drive force from the second drive source M2 to the supply roller 41, the separation roller 42, the first conveyance roller 43, the second conveyance roller 44 and the discharge roller 47. Accordingly, the sheet SH supported on the supply tray 91 is fed to the conveyance guide 30 and is sequentially conveyed along the conveyance guide 30.

At this time, as shown with a polygonal line L2 in FIG. 11, the separation roller 42 and the retard roller 42A nip the sheet SH and conveys the same toward the reading surface 8B after the second drive source M2 is operated. As shown with a polygonal line L3 in FIG. 11, the controller 7 reads an image on the sheet SH by the reading sensor 3S stopped at the stationary reading position when the sheet SH being conveyed passes above the reading surface 8B. As shown with a polygonal line L4 in FIG. 11, the discharge roller 47 and the discharge pinch roller 48 nip the sheet SH and discharges the same from the discharge opening 69 toward the discharge tray 96 after the reading sensor 3S starts the reading of the image on the sheet SH.

As shown with the polygonal line L2 in FIG. 11, while the reading sensor 3S is reading the image on the sheet SH, after the sheet SH is not nipped, the separation roller 42 and the retard roller 42A nip a next sheet SH with an interval. Then, the separation roller 42 and the retard roller 42A repetitively perform the operation until there is no sheet SH supported on the supply tray 91.

As shown with the polygonal line L3 in FIG. 11, after ending the reading of the image on the sheet SH, the reading sensor 3S starts the reading of an image on a next sheet SH with an interval. Then, the reading sensor 3S repetitively performs the operation until there is no sheet SH supported on the supply tray 91. The timing after the reading sensor 3S starts the reading of the image on one sheet SH until the reading is over is referred to as a reading timing T3.

As shown with the polygonal line L4 in FIG. 11, after the reading sensor 3S ends the reading of the image on the sheet SH, when predetermined time elapses and then the sheet SH is not nipped, the discharge roller 47 and the discharge pinch roller 48 nip a next sheet SH with an interval. Then, the discharge roller 47 and the discharge pinch roller 48 repetitively perform the operation until there is no sheet SH supported on the supply tray 91.

During the above operation, the controller 7 rotates the movable plate 50 toward the second position shown in FIG. 6 and the like, based on the detection signal of the holder posture detection sensor 42J in correspondence to reduction in the number of the sheets SH supported on the supply tray 91. Also, the controller 7 rotates the discharge unit 60 toward the fourth position shown in FIG. 6 and the like in correspondence to the increase in angle at which the movable plate 50 rotates from the first position shown in FIG. 5 and the like toward the second position shown in FIG. 6 and the like.

As shown with the polygonal lines L6, L7 in FIG. 11, the controller 7 switches the first electromagnetic clutch C1 to the connection state to start the rotation of the movable plate 50 after the first timing T1A, places the holder 42F to the appropriate posture shown in FIGS. 5 and 6 and then switches the first electromagnetic clutch C1 to the disconnection state to end the rotation of the movable plate 50. At this time, the timing after the movable plate 50 starts the rotation until the rotation is over is referred to as a first timing T1B.

The first timing T1B is executed for a time period in which the reading sensor 3S reads the image on the sheet SH and the discharge roller 47 and the discharge pinch roller 48 nip the sheet SH. The reason is that the conveying speed of the sheet SH of which the image is read is determined by the discharge roller 47 and the discharge pinch roller 48 and the rotation of the movable plate 50 is less likely to influence the conveying speed. The first timing T1B is executed more than once in the above time period, as required, until the image forming operation is over.

As shown with the polygonal lines L8, L9 in FIG. 11, the controller 7 switches the second electromagnetic clutch C2 to the connection state to start the rotation of the discharge unit 60 after the second timing T2A, rotates the discharge unit 60 by a necessary amount and then switches the second electromagnetic clutch C2 to the disconnection state to end the rotation of the discharge unit 60. At this time, the timing after the discharge unit 60 starts the rotation until the rotation is over is referred to as a second timing T2B.

The second timing T2B is set as a time period after the reading sensor 3S ends the reading of the image on the sheet SH and before the reading sensor 3S starts the reading of an image on a next sheet SH. That is, the reading timing T3 in which the reading sensor 3S is reading the image on the sheet SH and the second timing T2B are totally different. The reason is that the conveying speed of the sheet SH of which the image is read is determined by the discharge roller 47 and the discharge pinch roller 48 and the rotation of the discharge unit 60 is likely to influence the conveying speed. The second timing T2B is executed more than once in the above time period, as required, until the image forming operation is over. At this time, a length of the second timing T2B can be appropriately changed within a range totally different from the reading timing T3.

As can be clearly seen from the comparison with the polygonal lines L7, L9 in FIG. 11, the first timing T1B for which the movable plate 50 rotates and the second timing T2B for which the discharge unit 60 rotates are totally different, and the second timing T2B is later than the first timing T1B.

As shown in FIG. 6, when the sheets SH supported on the supply tray 91 decrease and no sheet SH remains, the controller 7 stops the second drive source M2 to end the image reading operation.

Thereafter, the controller 7 controls the scanning mechanism drive source 3M of the reading unit 3 to operate the scanning mechanism (not shown) to return the reading sensor 3S to the standby position. Also, after checking that there is no remaining sheet SH supported on the discharge tray 96 by a detection means (not shown), the controller 7 operates the first drive source M1 to rotate the drive gear M1G in the clockwise direction in FIG. 9. Then, the controller 7 appropriately switches the first electromagnetic clutch C1 and the second electromagnetic clutch C2 to the connection state, so as to return the movable plate 50 to the first position shown in FIG. 5 and the like and the discharge unit 60 to the third position shown in FIG. 5 and the like.

<Operational Effects>

According to the image reading apparatus 1 of the first illustrative embodiment, as shown in FIG. 11, the first timings T1A, T1B and the second timings T2A, T2B are different. Accordingly, in the image reading apparatus 1, it is possible to reduce loads of the upstream-side drive train 100, the first downstream-side drive train 110 and the second downstream-side drive train 120 for transmitting the drive force to the movable plate 50 and the discharge unit 60, and to reduce power necessary for the first drive source M1 to generate the drive force. Therefore, it is possible to suppress the high-strengthening and enlargement of components such as the gears configuring the upstream-side drive train 100, the first downstream-side drive train 110 and the second downstream-side drive train 120. Also, it is possible to suppress the enlargement of the first drive source M1 and an internal power supply configured to supply power to the first drive source M1.

Therefore, according to the image reading apparatus 1 of the first illustrative embodiment, it is possible to reduce the manufacturing cost.

Also, according to the image reading apparatus 1, the first timings T1A, T1B and the second timings T2A, T2B are totally different. Specifically, the second timing T2A does not include a range overlapping the first timing T1A. The second timing T2B does not include a range overlapping the first timing T1B. Therefore, upon activations and normal operations of the first drive source M1, the upstream-side drive train 100, the first downstream-side drive train 110 and the second downstream-side drive train 120, it is possible to securely suppress the loads of the upstream-side drive train 100, the first downstream-side drive train 110 and the second downstream-side drive train 120 and the power necessary for the first drive source M1.

Also, according to the image reading apparatus 1, the second timing T2A is later than the first timing T1A. The second timing T2B is later than the first timing T1B. Here, in the image reading apparatus 1, in order to favorably convey the sheet SH supported on the supply tray 91 to the conveyance guide 30, it may be advantageous to rotate the position of the movable plate 50 so as to make an appropriate relative positional relationship with the conveyance guide 30 in correspondence to reduction in the number of the sheets SH supported on the supply tray 91. Also, since the number of sheets SH supported on the discharge tray 96 is small at an early stage of the image reading operation, it is less necessary to move upward the discharge opening 69 so as to secure a discharge space. In this regard, the configuration as described above is employed, so that it is possible to preferentially keep the movable plate 50 and the conveyance guide 30 at the appropriate relative positional relationship, before rotating the discharge unit 60. As a result, it is possible to favorably convey the sheet SH.

Also, according to the image reading apparatus 1, as shown in FIGS. 7, 11 and the like, the first timings T1A, T1B are controlled by the disconnection/connection of the first electromagnetic clutch C1 configured to transmit the drive force to the movable plate 50, so that it is possible to accurately execute the first timings T1A, T1B.

Also, according to the image reading apparatus 1, as shown in FIGS. 7, 9 and the like, the movable plate 50 and the first electromagnetic clutch C1 are coupled to each other via the worm gear 115 and the worm wheel gear 116. By this configuration, even when the first electromagnetic clutch C1 is in the disconnection state, it is possible to restrain the rotation of the movable plate 50 by the self-lock of the worm gear 115 and the worm wheel gear 116. Therefore, the movable plate 50 is favorably kept at the position without moving downward.

Also, according to the image reading apparatus 1, as shown in FIGS. 7, 11 and the like, the second timings T2A, T2B are controlled by the disconnection/connection of the second electromagnetic clutch C2 configured to transmit the drive force to the discharge unit 60, so that it is possible to accurately execute the second timings T2A, T2B.

Also, according to the image reading apparatus 1, as shown in FIGS. 7, 9 and the like, the discharge unit 60 and the second electromagnetic clutch C2 are coupled to each other via the worm gear 125 and the worm wheel gear 126. By this configuration, even when the second electromagnetic clutch C2 is in the disconnection state, it is possible to restrain the rotation of the discharge unit 60 by the self-lock of the worm gear 125 and the worm wheel gear 126. As a result, the discharge unit 60 is favorably kept at the position without moving downward.

Also, according to the image reading apparatus 1, as shown in FIG. 1, the reading timing T3 in which the reading sensor 3S reads the image on the sheet SH and the second timings T2A, T2B are totally different. As the discharge unit 60 rotates, the discharge roller 47 and the discharge roller 48 are moved, so that the conveying speed of the sheet SH being conveyed on the conveyance guide 30 may become unstable and the reading accuracy of the reading sensor 3S may be lowered. In this regard, the configuration as described above is employed, so that the conveying speed of the sheet SH being conveyed on the conveyance guide 30 is less likely to become unstable. Therefore, it is possible to suppress the reading accuracy of the reading sensor 3S from being lowered.

Also, according to the image reading apparatus 1, since the first drive source M1 is configured to drive the movable plate 50 and the discharge unit 60, it is possible to reduce the component cost of the drive source, as compared to a configuration where a drive source for the movable plate 50 and a drive source for the discharge unit 60 are provided.

Second Illustrative Embodiment

Figure 12:
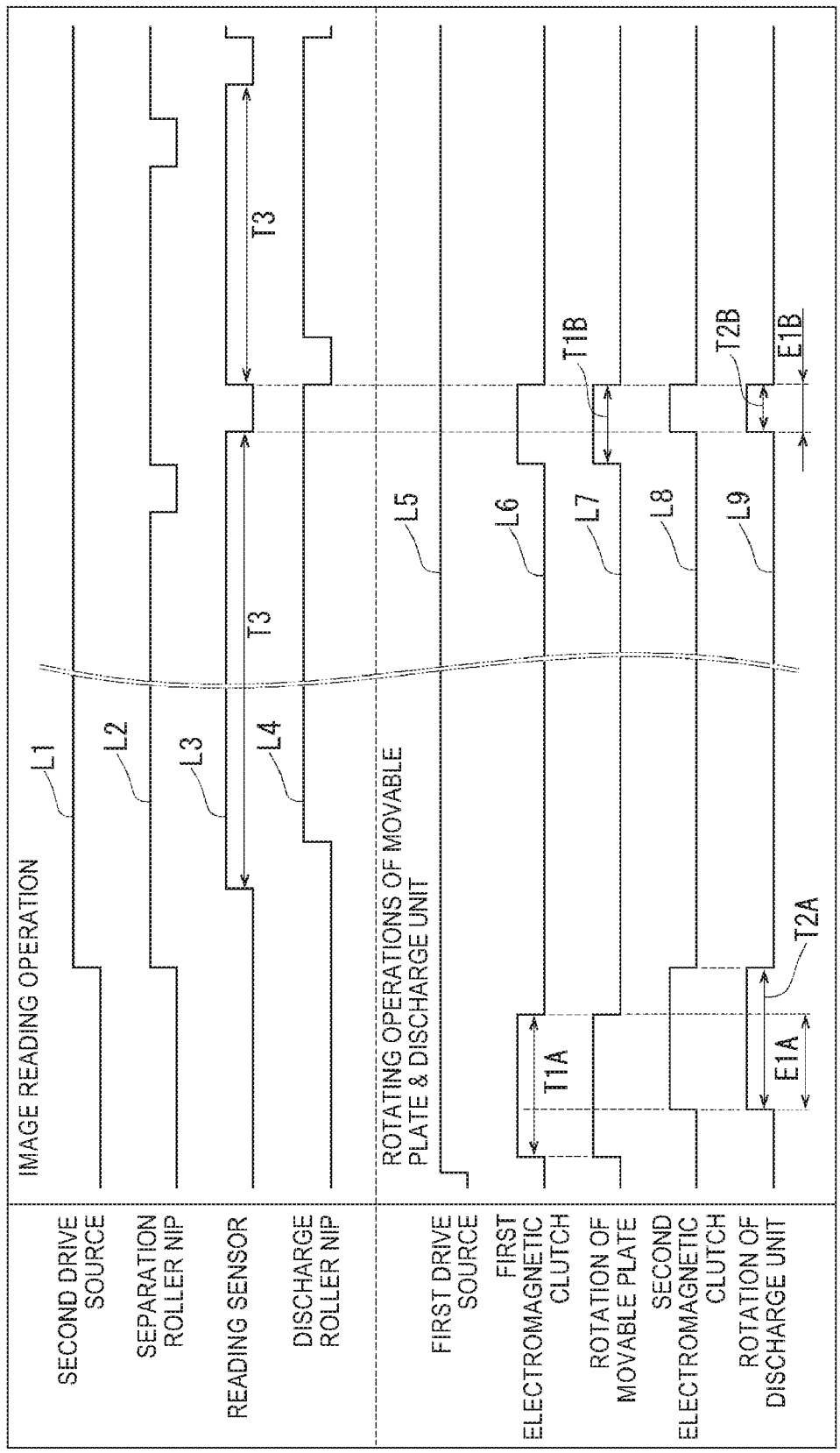
FIG. 12 relates to an image reading apparatus of a second illustrative embodiment, illustrating a timing chart for showing an image reading operation and rotating operations of the movable plate and the discharge unit.

As shown in FIG. 12, in an image reading apparatus of a second illustrative embodiment, the second timing T2A relating to the image reading apparatus 1 of the first illustrative embodiment is changed to include a range E1A overlapping the first timing T1A, and the second timing T2B relating to the image reading apparatus 1 of the first illustrative embodiment is changed to include a range E1B overlapping the first timing T1B.

Specifically, the first timing T1A starts earlier than the second timing T2A and the first timing T1A is over earlier than the second timing T2A. Also, the first timing T1B starts earlier than the second timing T2B and the first timing T1B and the second timing T2B are over at the same time. That is, the second timing T2 is later than the first timing T1.

The other configurations of the second illustrative embodiment are the same as the first illustrative embodiment. Therefore, the same configurations as the first illustrative embodiment are denoted with the same reference numerals, and the descriptions thereof are omitted or simplified.

In the image reading apparatus 1 of the second illustrative embodiment configured as described above, upon the operations of the first drive source M1, the upstream-side drive train 100, the first downstream-side drive train 110 and the second downstream-side drive train 120, it is possible to suppress the loads of the upstream-side drive train 100, the first downstream-side drive train 110 and the second downstream-side drive train 120 and the power necessary for the first drive source M1. Also, in a range except the range E1A in which the second timing T2A overlaps the first timing T1A and in a range except the range E1B in which the second timing T2B overlaps the first timing T1B, even during the normal operations of the first drive source M1, the upstream-side drive train 100, the first downstream-side drive train 110 and the second downstream-side drive train 120, it is possible to suppress the loads of the upstream-side drive train 100, the first downstream-side drive train 110 and the second downstream-side drive train 120 and the power necessary for the first drive source M1.

Therefore, according to the image reading apparatus of the second illustrative embodiment, it is possible to reduce the manufacturing cost, like the image reading apparatus 1 of the first illustrative embodiment.

Although the present invention has been described with reference to the first and second illustrative embodiments, the present invention is not limited to the first and second illustrative embodiments and can be appropriately changed without departing from the gist of the present invention.

For example, the first timing and the second timing are not limited to the first timings T1A, T1B and the second timings T2A, T2B of the first and second illustrative embodiments. A configuration where the first timing and the second timing are totally different and the first timing is later than the second timing is also within the inventive concept of the present invention. Also, a configuration where a range in which the second timing overlaps the first timing is provided and the first timing is later than the second timing is also within the inventive concept of the present invention.

As the first electromagnetic clutch, a clutch of which connection and disconnection are mechanically switched may also be used, instead of the first electromagnetic clutch C1 of the first and second illustrative embodiments. Specifically, a configuration may be employed where the solenoid of the electromagnetic clutch is replaced with a cam configured to rotate by operation of the drive source and a rod configured to connect/disconnect the clutch mechanism in conjunction with rotation of the cam. The same applies to the second electromagnetic clutch.

The inventive concept of the preset invention can be used for an image reading apparatus, a complex machine and the like, for example.

The invention claimed is:

1. An image reading apparatus comprising:
    a supply tray configured to support sheets to be fed and including a movable plate configured to move from a first position to a second position in correspondence to reduction in a number of the sheets supported on the supply tray, the second position being higher than the first position;
    a discharge tray located below the supply tray and configured to support discharged sheets;
    a conveyance passage configured to guide a sheet conveyed from the supply tray toward the discharge tray;
    a reading sensor configured to read an image on the sheet conveyed along the conveyance passage;
    a discharge passage having a discharge opening for discharging the sheet conveyed along the conveyance passage to the discharge tray and configured to move from a third position to a fourth position in correspondence to reduction in the number of the sheets supported on the supply tray, the fourth position being higher than the third position; and
    a motor configured to generate a drive force,
    wherein a first timing for which the movable plate is to move and a second timing for which the discharge passage is to move are different, and
    wherein the motor is configured to drive the movable plate and the discharge passage independently.

2. The image reading apparatus according to claim 1, wherein the first timing and the second timing are temporally distinct.

3. The image reading apparatus according to claim 2, wherein the second timing is later than the first timing.

4. The image reading apparatus according to claim 1, wherein the second timing includes a range overlapping the first timing.

5. The image reading apparatus according to claim 1, further comprising:
    a first electromagnetic clutch configured to transmit the drive force to the movable plate and control the first timing by connection and disconnection of the first electromagnetic clutch.

6. The image reading apparatus according to claim 5, further comprising:
    a worm gear and a worm wheel gear via which the movable plate and the first electromagnetic clutch are coupled to each other.

7. The image reading apparatus according to claim 1, further comprising:
    a second electromagnetic clutch configured to transmit the drive force to the discharge passage and control the second timing by connection and disconnection of the second electromagnetic clutch.

8. The image reading apparatus according to claim 7, further comprising:
    a worm gear and a worm wheel gear via which the discharge passage and the second electromagnetic clutch are coupled to each other.

9. The image reading apparatus according to claim 1, wherein a reading timing for which the reading sensor is to read the image on the sheet and the second timing are totally different.

* * * * *